United States Patent [19]
Lambregts

[11] 3,901,466
[45] Aug. 26, 1975

[54] THRUST AND FLIGHT PATH CONTROL DECOUPLING SYSTEM

[75] Inventor: Antonius A. Lambregts, Renton, Wash.

[73] Assignee: The Boeing Company, Seattle, Wash.

[22] Filed: Dec. 20, 1973

[21] Appl. No.: 426,852

Related U.S. Application Data

[62] Division of Ser. No. 307,286, Nov. 16, 1972.

[52] U.S. Cl. .......................... 244/77 D; 235/150.2
[51] Int. Cl.² .................................... B64C 13/18
[58] Field of Search .................... 73/178 R, 178 T; 235/150.2, 150.21; 244/77 D; 340/27 R, 27 SS

[56] References Cited
UNITED STATES PATENTS

| | | | |
|---|---|---|---|
| 3,128,967 | 4/1964 | Hays | 244/77 D |
| 3,522,729 | 4/1970 | Miller | 244/77 D X |
| 3,814,912 | 6/1964 | Manke et al. | 244/77 D X |

Primary Examiner—Trygve M. Blix
Assistant Examiner—Stephen G. Kunin
Attorney, Agent, or Firm—Conrad O. Gardner; Glenn Orlob

[57] ABSTRACT

Signals representative of the acceleration of an aircraft due to the change in flight path angle are coupled through a high pass filter (washout circuit) to obtain a short term compensation signal ($\dot{V}_{comp}$) which signal is further coupled to a low pass filter which provides short term integration to obtain the compensation signal ($\Delta V_{comp}$) representative of change in speed in response to change in flight path angle. These compensation signals ($\dot{V}_{comp}$) and ($\Delta V_{comp}$) are summed respectively with signals representative of longitudinal acceleration (or thrust control damping) and air speed error (or thrust control reference) to inhibit short term thrust control of the aircraft due to small flight path angle perturbations thereby improving the manual path control handling quality and the stability of the aircraft by the automatic control system. A modification of the system is disclosed for avoiding sensor noise developed by the α (angle of attack) vane sensor by utilization of other inputs to the system signal processing.

15 Claims, 7 Drawing Figures

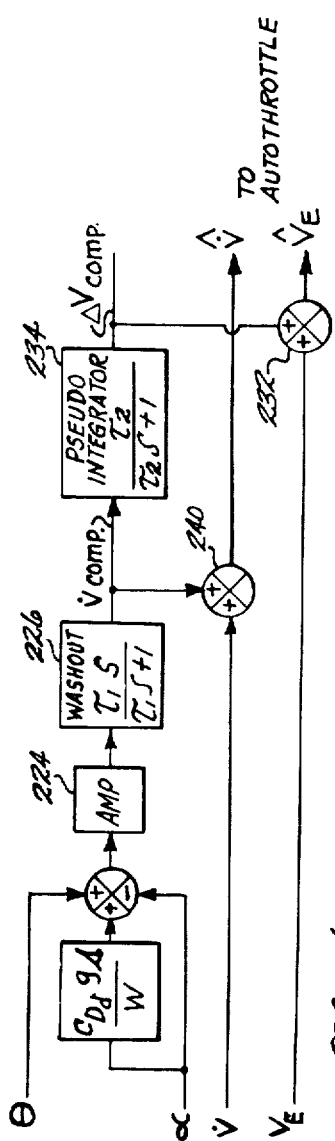
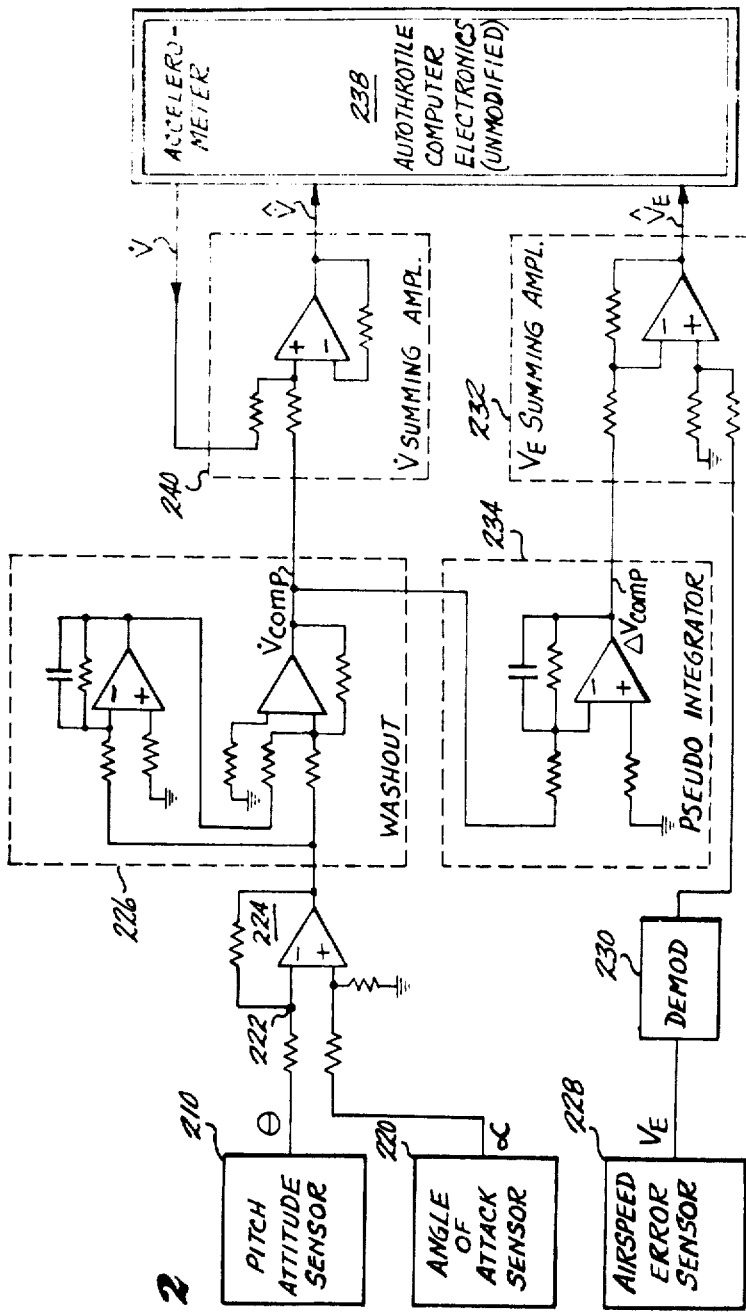
Fig. 1
Fig. 2

VARIABLE WASHOUT AND PSEUDO-INTEGRATOR TIME CONSTANTS AS A FUNCTION OF $V_E$ AND $\dot{V}$

THRUST AND FLIGHT PATH CONTROL DECOUPLING SYSTEM

This is a division, of application Ser. No. 307,286 filed Nov. 16, 1972.

This invention relates to aircraft flight control and more particularly to a means for improving thrust - flight path control relationships.

Present flight control systems having automatic speed control utilizing thrust as a control parameter result in degradation in stability of flight path angle because thrust is a key parameter in determining static flight path angle, and further, pitching moments associated with thrust changes cause dynamic pitch and flight path angle instability for constant elevator position. To hold a constant flight path angle with autothrottle engaged requires therefore a constant coordination of elevator inputs with thrust variations to compensate for thrust effects on the flight path angle.

When the flight path is controlled manually, degradation of the handling quality of the airplane having these systems results. The above effects in these known systems explains why it is actually more satisfactory for the pilot to control both flight path and speed manually, rather than flight path only with speed controlled by the autothrottle.

It is accordingly an object of the present invention to provide means for improving attitude and flight path stability, pitch control and speed control coupling, and throttle response by minimizing undesired throttle activity in an aircraft having automatic speed control wherein thrust is utilized as a control parameter.

It is further an object of this invention to provide means utilizing the conversion principle of potential and kinetic energy of an elevator controlled flight path for reducing throttle activity to obtain decoupling of short term thrust control from flight path control thereby improving the handling quality of manual flight path control and/or improving stability of the combination autopilot and autothrottle systems.

The above and other objects are achieved in accordance with a first embodiment of the invention wherein path deviation information is utilized in the system signal processing to compute the related acceleration and speed deviation and provide first and second compensation signals for inhibiting autothrottle response to short term flight path deviations. More specifically signals representative of pitch attitude ($\theta$) and angle of attack ($\alpha$) are utilized in the aforementioned signal processing to provide the compensating signals. The first and second compensating signals are combined respectively with acceleration and speed representative signals of the prior art, viz., $\dot{V}$ and $V_E$ heretofore normally inputted to the autothrottle, to however provide respectively compensated acceleration and speed representative signals $\dot{V}$ and $V_E$ for inhibiting autothrottle response in accordance with the teachings of the present invention.

In accordance with a second embodiment of this invention the aforementioned signal processing to develop the first and second compensating signals utilizes signals representative of pitch attitude ($\theta$) and angle of attack ($\alpha$) although the mathematical counterparts thereof are actually utilized and developed respectively from $\dot{V}$, and $\Delta$ Thrust and $V_E$ and wherein the equivalent gains required are obtained from the speed equation. This second embodiment eliminates the use of the $\alpha$ vane sensor and noise resulting therefrom in this system and still provides pitch attitude $\theta$ and angle of attack $\alpha$ representative signals for system signal processing.

Further features and advantages of the invention will readily become apparent from the following specification and from the drawings, in which:

FIG. 1 is a block diagram of a system for providing energy compensated automatic thrust control utilizing signals representative of $\theta$ and $\alpha$ in accordance with a first embodiment of the present invention;

FIG. 2 is a schematic circuit diagram of the system shown in block form in FIG. 1;

Figure 3:
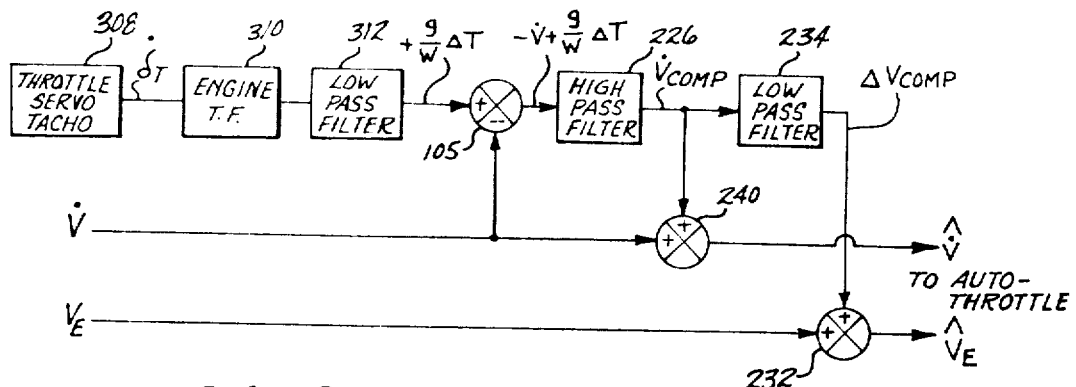
FIG. 3 is a block diagram of a system for providing energy compensated automatic thrust control however utilizing signals representative of $\dot{V}$, $\Delta T$ and $V_E$ in accordance with a second embodiment of the present invention.

Turning now to a brief analysis of the problem presented in thrust and flight path control deemed helpful to a more complete understanding and appreciation of the present system, it will be noted as hereinbefore briefly mentioned that during manual speed control, the pilot generates far less throttle activity than that generated in present state of the art systems, while holding a speed within the same tolerances. The reasons for minimum throttle activity by the pilot compared to state of the art systems are first, the pilot does not attempt fine control the last knot or so of speed error by changing thrust; second, the pilot utilizes elevator instead of thrust to control small speed errors associated with flight path errors; and third, since thrust does not change automatically in response to small speed errors, the flight path is stable, making control of flight path stable and causing less induced air speed errors.

A further understanding of the pilot's speed flight path control technique may be had by considering the following approximate static aircraft force equations:

1 $T = D + W \sin \gamma$
2 $L$ (lift) $= W \cos \gamma$

From (1) follows

3 $\sin \gamma = T\text{-}D/W$ where
  $T =$ total thrust
  $D =$ total drag
  $W =$ weight
  $\gamma =$ flight path angle Since the airplane is being operated very close to or at minimum drag speed (V), where $$\frac{dD}{dV} = 0$$

essentially, the steady state flight path angle is only a function to thrust and is independent of speed. With thrust constant, the speed is controlled by the elevator which has no authority to change $\gamma$ statically, and is instrumental only in shifting the equilibrium between thrust, lift and drag, visualized by the parameters pitch attitude $\theta$, angle of attack $\alpha$ and speed V. In the dynamic process of shifting this equilibrium, the total energy of the system is conserved, neglecting the relatively small perturbation due to dynamic variation in drag.

4  $mg(h_0 + dh) + \frac{1}{2} m (V_o + dv) = $ constant or
5  $dh/dv = -V_o/g$ where
$m$ = mass
$g$ = gravity constant
$h_o$ = initial altitude
$V_o$ = initial speed
$dh$ = altitude perturbation
$dV$ = speed perturbation For an approach speed of 240 ft/s then $$\frac{dh}{dV} = \frac{-7.5 \text{ ft}}{\text{ft/s}}$$

and for a 5 knot maneuver margin, the airplane may be displaced 63 ft vertically. This is generally adequate to control small perturbations without changes in thrust setting, once the airplane is thrust-trimmed for the desired flight path.

The above discussed principles of the balance of total energy are utilized in the system embodiments of the present invention for improving stability of flight path control, reducing flight path/speed control coupling and minimizing throttle activity by what may be termed "energy compensated speed control.". In energy compensated speed control hereinafter described in detail, when the command is to fly a constant path, the speed perturbations induced by path deviations are automatically nulled by eliminating the path error. Further, where the autothrottle is temporarily inhibited from re-acting to such speed errors, the commanded path correction can be made without the interference of changing thrust resulting in substantially more stable attitude and path control while significantly reducing throttle activity.

The aforementioned speed perturbations due to path deviations can be computed from $\theta$ and $\alpha$ through the following formula:

6  $dV = -g/V_o \cdot dh$ or
7  $dV = -g/V_o \cdot V_o \sin \Delta \alpha \, dt$ or
8  $dV/dt = -g \cdot \Delta(\theta - \alpha) = -\dot{v}$ compensation, and
g. $\Delta v = -g \int \Delta(\theta - \alpha) \, dt = -\Delta V$ compensation.

The formula (6)

$$dV = \frac{-g}{V_o} dh$$

is an approximation and is accurate particularly in the low frequency range of the phugoid. In the frequency range above the short period, the drag change due to $\alpha$ becomes important.

10. $\Delta D = + C_{D_\alpha} \cdot \Delta \alpha \cdot q \cdot s$ where
$C_{D_\alpha}$ = drag coefficient change per unit in $\alpha$

(11)  $(\dot{V})C_{D_\alpha} = \dfrac{-C_{D_\alpha} \cdot \Delta \alpha \cdot q \cdot S}{\dfrac{W}{g}}$ where
$q$ = dynamic pressure
$s$ = wing area
$w$ = weight
$g$ = gravity acceleration constant This term (11) may be included in the formulas (8) and (9) of the compensation signals.

(12)  $\dot{V}_{comp} = + g \cdot \Delta(\theta - \alpha) + \dfrac{C_{D_\alpha} \cdot q \cdot S \cdot g}{W} \Delta \alpha$

(13)  $\Delta V_{comp} = + g \int \left\{ \Delta(\theta - \alpha) + \dfrac{C_{D_\alpha} \cdot q \cdot S \cdot \Delta \alpha}{W} \right\} dt$ The measured values of $\dot{V}$ and $V_E$ are compensated for path deviations by adding in the system respectively the developed compensation signals $\dot{V}_{comp}$ (12) and $\Delta V_{comp}$ (13).

These compensation signals have to be washed out (coupled through a high pass filter circuit) to allow air speed errors originating from path changes to be controlled gradually and to allow for steady state values of $\theta$ and $\alpha$.

To obtain $\dot{V}_{comp}$ the signal representative of the expression $$g \left\{ (\theta - \alpha) + \dfrac{C_{D_\alpha} \, qS}{W} \alpha \right\}$$

is fed through a washout circuit. $\Delta \dot{V}_{comp}$ is obtained by feeding $V_{comp}$ through a filter circuit having a long time lag characteristic which thereby provides integration over relatively short term periods termed pseudo integrator type signal processing. A pseudo integrator type circuit instead of a pure integrator circuit is required to prevent continuous storage of the compensation signal $\Delta V_{comp}$ which would cause an air speed bias. The resulting energy compensated speed control system for providing the aforementioned type signal processing is shown in block diagram form in FIG. 1 where:

$C_{D_\alpha} = \dfrac{dC_D}{d\alpha}$ = drag coefficient change per unit change in $\alpha$ $q = \dfrac{1}{2} \rho V^2$ = dynamic pressure $V$ = air speed
$s$ = wing area
$S$ = LaPlace operator
$\tau_1$ = washout time constant
$\tau_2$ = "pseudo" integrator time constant
$W$ = weight
$\dot{V} = \dot{V} + \dot{V}_{comp}$
$\dot{V}_E = v_E + \Delta v_{comp}$ The compensated signals $\dot{V}$ and $\dot{V}_E$ provided by the present system signal processing are coupled to the autothrottle inputs instead of the respective uncompensated signals $\dot{V}$ and $V_E$ utilized in previous systems without any requirement of modification of autothrottle control law electronics downstream of the previous autothrottle inputs.

Turning now to FIG. 2 it will be seen how in an exemplary schematic form showing the types of circuits required, the signal processing developed in the preceding and shown in block form in FIG. 1 may be provided. More specifically the system of FIG. 2 is illustrative of a means for developing compensated signals representative of longitudinal acceleration $\dot{V}$ (thrust control damping) and air speed error $\dot{V}_E$ (thrust control reference) from signals representative of sensed longitudinal acceleration (thrust control damping) $\dot{V}$, air speed error (thrust control reference) $V_E$, pitch attitude $\theta$, and angle of attack $\alpha$. These compensated signals $\dot{V}$ and $\dot{V}_E$ are coupled respectively to the autothrottle inputs instead of the signals $\dot{V}$ and $V_E$ heretofore coupled thereto. Pitch attitude sensing means 210 provides signal representative of pitch attitude ($\theta$) and angle of attack sensing means 220 provides a signal representative of angle of attack ($\alpha\alpha$), these signals being combined by coupling to summing amplifier circuit means 224. This amplifier circuit 224 provides at the output thereof a signal representative of $$g \left\{ \theta + \left( \frac{C_{D\alpha} \, qs}{W} - 1 \right) \alpha \right\}$$

which is coupled to the input washout (high pass filter) circuit means 226. The output of washout circuit means 226 comprising the compensation signal $\dot{V}_{comp}$, and a third signal $\dot{V}$ representative of longitudinal acceleration provided by the attitude compensated longitudinal accelerometer in the autothrottle means 238, are coupled to summing amplifier circuit means 240 to provide a signal ($\dot{V}$) representative of compensated longitudinal acceleration (thrust control damping) for coupling to autothrottle 238 and utilization by the autothrottle computer electronic circuits of the prior art.

The output of the washout circuit means 226 (comprising the aforementioned compensation signal $\dot{V}_{comp}$) is coupled to the input of pseudo integrator (low pass filter) circuit means 234 to obtain an output compensation signal ($\Delta \dot{V}_{comp}$) which is the air speed error correction term for flight path error. The output from circuit means 234 comprising the $\Delta V_{comp}$ signal, and a signal representative of air speed error ($V_E$) obtained from air speed error sensing means 228 after demodulation in circuit 230, are coupled to summing amplifier circuit means 232 to obtain a signal ($V_E$) representative of compensated air speed error (thrust control reference) for coupling to autothrottle 238 and utilization by the autothrottle computer electronic circuits of the prior art.

The embodiments hereinbefore discussed for developing the compensated signals for coupling to the autopilot system rely on the use of an $\alpha$-vane sensor. However, noise developed from this input sensor and replacing the pitch attitude $\theta$ and angle of attack $\alpha$ representative signals as inputs to the system by their mathematically derived counterparts, viz., as derived from signals representative of V, $\Delta$ Thrust and $V_E$ in the following manner for use in further embodiments of the invention hereinafter described.

Recalling that equation (11) utilizing angle of attack ($\alpha$) information defined the compensation signal:

(11) $\dot{V}$ comp = $+g \cdot \Delta(\theta - \alpha) + \frac{C_{D\alpha} \, q \cdot s \cdot g}{W} \Delta\alpha$ and that the forward acceleration of an aircraft is defined by:

(a) $\frac{W}{g} \cdot \dot{V} = \Delta T - W \sin \Delta(\theta - \alpha) - D_V \cdot \Delta V - D\alpha \cdot \Delta\alpha$ where
$W$ = weight of the aircraft
$g$ = gravity acceleration
$\Delta T$ = change in thrust
$\Delta\theta$ = change in pitch attitude
$\Delta\alpha$ = change in angle of attack
$D_V$ = change in drag per unit speed change
$D\alpha = C_{D\alpha} \cdot q \, S$ change in drag per unit change in angle of attack
$\Delta V$ = change in speed
reworking (a) yields for small $\Delta (\theta-\alpha)$ (b) $\Delta (\theta-\alpha) + \frac{C_{D\alpha} \, q \cdot s \cdot g}{W} \Delta\alpha = \dot{V} + \frac{g}{W} \Delta T - \frac{g}{W} D_V \cdot \Delta V$ Combining (11 and (b) yields (c) $\dot{V}$ comp = $-\dot{V} + \frac{g}{W}(\Delta T - D_V \cdot \Delta V)$ Instead of using signals representative of $\theta$ and $\alpha$ for providing the compensation signal $V_{comp}$, it is possible as seen from the preceding expression to use the parameters: $\dot{V}$ measured by an attitude compensated accelerometer, $\Delta T$ derived from the throttle displacement or other thrust representative signal, and $\Delta V$ measured by the air speed indicator, in signal processing by circuits arranged in the manner now shown in block form in FIG. 3 to provide the compensation signal $\dot{V}_{comp}$.

In the turbulent air, $\alpha$ fluctuates rapidly and implementation of equation ( ) utilizing $\alpha$ to provide the compensation signals $\dot{V}_{comp}$ and $\Delta V_{comp}$ results in considerable throttle activity. It should be further noted that it is difficult to filter out the turbulence noise on the $\alpha$ signal developed from an $\alpha$-vane sensor while retaining meaningful $\alpha$-information.

In equation (c), which is mathematically identical to equation (11), the term $D_V \cdot \Delta V$ is normally very small since the airplane is operated near the minimum drag point where $D_V = 0$. However, this term reflects almost totally the fluctuation in the compensation signal $\dot{V}_{comp}$ due to turbulence.

By omitting this term we get the desired compensation signal (d) $\dot{V}$ comp = $-\dot{V} + \frac{g}{W} \Delta T$ containing all the meaningful information to achieve the original goal of thrust and flight path decoupling without introducing throttle activity due to turbulencenoise signal components.

The required signal representative of $\Delta T$ may be derived from the throttle rate in the following manner:

e $\delta T = \int \dot{\delta}_T \, dt$ where $\delta_T$ = throttle displacement Since only short term information is needed the integration can be accomplished by a pseudo integrator (low pass filter) circuit 312 coupled in series circuit path with throttle servotachometer means 308 and circuit 310 representative of engine transfer function (Engine T.F.) to provide a signal representative of $$+ \frac{g}{W} \Delta T$$

$$(f) \; \delta_T \approx \frac{\tau_3}{\tau_3 S + 1} \dot{\delta}_T$$

where $\frac{\tau_3}{\tau_3 S + 1}$ = transfer function of low pass filter circuit 312

The change in thrust is related to the change in throttle position by the engine transfer function G (S)$_E$ in the following manner:

g $\Delta T$ = G (S)$_E$ · $\delta T$

Combining the equations (f) and (g) yields $$(h) \; \Delta T = G(S)_E \frac{\tau_3}{\tau_3 + 1} \dot{\delta}_T$$

Figure 5:
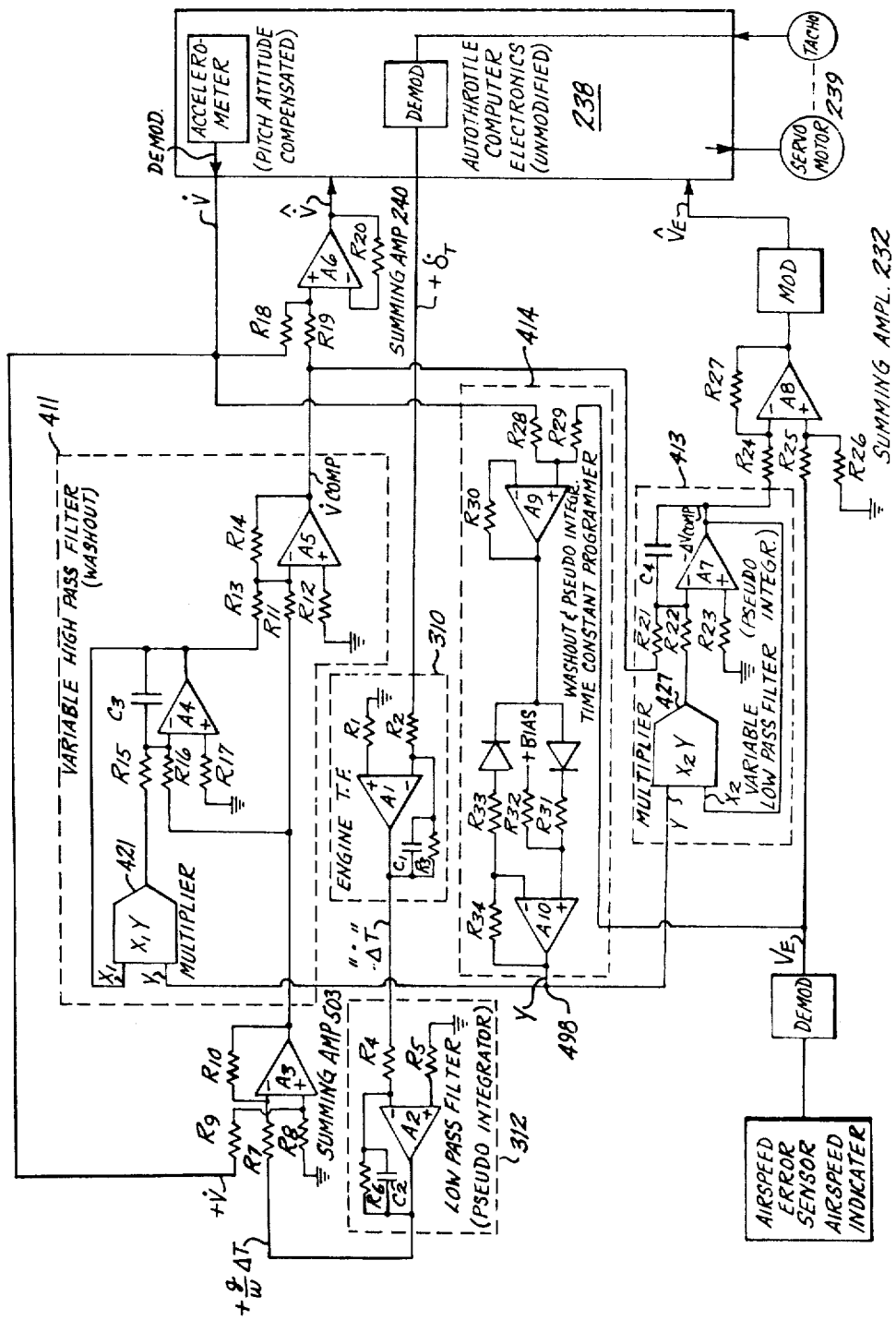
FIG. 5 is a schematic diagram of the system shown in block form in FIG. 3 incorporating however the feature of filter time constant programming shown in FIG. 4.

Circuit 310 representative of the engine transfer function [G(S)$_E$] is a known transfer function which can be implemented more specifically by circuitry as shown in more detail in the schematic of FIG. 5. A signal representative of $\dot{\delta}_T$ is coupled to circuit 310 from the throttle servo-tachometer 308 shown in FIG. 3 which is normally part of autothrottle computer electronics 238 as shown in FIG. 5.

Substituting equation (h) into equation (d) yields the compensation signal $$(i) \; \dot{V} \text{ comp} = -\dot{V} + \frac{g}{W} G(S)_E \frac{\tau_3}{\tau_3 S + 1} \dot{\delta}_T$$

Since only short term compensation is desired, the signal developed at the output of filter circuit 312 is combined in adder circuit 105 with a signal representative of longitudinal acceleration $\dot{V}$ and coupled through a washout (high pass filter having a time constant $\tau_1$) circuit 226, of the type having a transfer function shown in the system of FIG. 1, and which may be implemented by the circuit 226 as shown in FIG. 2, thereby obtaining the compensation signal $\dot{V}_{comp}$ as represented by the following expression $$(j) \; \dot{V} \text{ comp} = \left( -\dot{V} + \frac{g}{W} G(S)_E \frac{\tau_3}{\tau_3 S + 1} \dot{\delta}_T \right) \frac{\tau_1 S}{\tau_1 S + 1}$$

and the compensation signal representative of $\Delta V_{comp}$ is obtained by coupling the compensation signal representative of $V_{comp}$ through pseudo integrator (low pass filter having a time constant $\tau_2$) circuit 234 so that $$(k) \; \Delta V \text{ comp} = (-\dot{V} + \frac{g}{W} G(S)_E \frac{\tau_3}{\tau_3 S + 1} \cdot \dot{\delta}_T) \frac{\tau_1 S}{\tau_1 S + 1} \frac{\tau_2}{\tau_2 S + 1}$$

The compensation signal representative of $\dot{V}_{comp}$ is combined with the signal representative of $\dot{V}$ by coupling the output of washout circuit 226 to adder means 240 (comprising a summing amplifier circuit of the type shown in more detail in FIG. 2) to provide the compensated signal $\dot{V}$ representative of compensated longitudinal acceleration (thrust control damping) for coupling to autothrottle. In similar manner the compensation signal representative of $\Delta V_{comp}$ is combined with the signal representative of $V_E$ in summing amplifier 232 to provide the compensated signal $\dot{V}_E$ representative of compensated air speed error (thrust control reference) for utilization by autothrottle.

Figure 4:
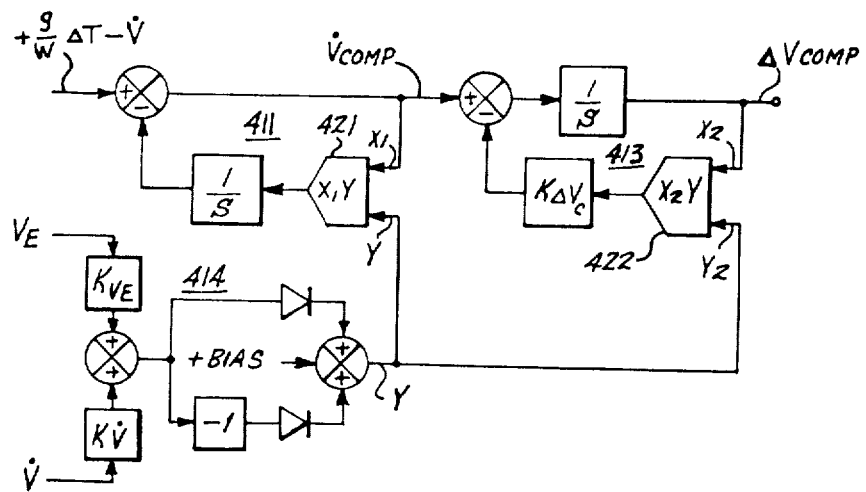
FIG. 4 is a block diagram of a means alternate to that shown in FIG. 3 for developing compensation signals limited to a predetermined small value in response to high rates of change of flight path in order to allow immediate control of large air speed errors.

Turning now briefly to a comparison of system block diagrams shown in FIGS. 3 and 4, it will be noted that the processing of the signals representative of $$(-\dot{V} + \frac{g}{W} \Delta T)$$

and $\dot{V}_{comp}$ in the system of FIG. 4 are different from the processing of these signals in the system of FIG. 3 only in that means are provided for varying the values of time constant $\tau_1$ in the high pass filter circuit (washout) means 411 and the time constant $\tau_2$ in the low pass filter circuit (pseudo integrator) means 413 in the circuit of FIG. 4 compared to the predetermined fixed values thereof in corresponding filter circuit means 226 and 234 in the circuit of FIG. 3. These time constants $\tau_1$ and $\tau_2$ in filter circuit means 411 and 413 respectively of the system of FIG. 4 are made to vary as a function of the sum of air speed error $V_E$ and, forward acceleration ($\dot{V}$) in such a manner that increasing air speed errors and forward acceleration decrease these filter circuit time constants, thereby effectively limiting the energy compensation function in the system of FIG. 4 to air speed errors smaller than about 4-5 knots. Representation of different values of time constants $\tau_1$ and $\tau_2$ as programmed for various values of $V_E$ and $\dot{V}$ is shown in the graphs of FIG. 7 and the system features and advantages resulting from time constant programming in the respective filter circuits will be described hereinafter in detail in connection with the description of these filter circuits as implemented in the systems of FIGS. 5 and 6. The equivalent circuit schematic for the system block diagram of FIG. 4 is given in FIG. 5 which however shows further specific circuitry for the development of the signal representative of $$(-\dot{V} + \frac{g}{W} \Delta T).$$

An important reason for utilizing the feature of variable time constant filtering means 411 and 413 as shown in the system of FIGS. 4 and 5 rather than high and low pass filters 226 and 234 having predetermined time constants as in the system of FIG. 3 is that for certain types of commanded flight path changes such as in glide scope captures and go-around maneuvers or drag changes due to configuration changes, large air speed errors would occur for high rates of change in flight path in a system such as FIG. 3 without immediate correction of thrust and, hence it may be desirable to utilize the FIGS. 4 and 5 embodiments where it is desired to limit energy compensation of speed control to air speed errors occurring below a predetermined small value.

Turning now to the block diagram of FIG. 4 it will be seen briefly how the compensation signals ($\dot{V}_{comp}$ and $\Delta V_{comp}$) are generated for use in an energy compensation of speed control system having a mode of operation responsive to small air speed errors only. In FIG. 4 it will generally be noted that circuit means 421 and 422 are provided for multiplying the loop gain in the respective filter circuits 411 and 413 by signals representative of the absolute sum of the amplified air speed error and forward acceleration, to which signals a positive (+) bias signal is added to provide programming control signal Y and which bias insures minimum loop gains ($1\tau_1$) and ($1/\tau_2$) respectively in the variable high pass filter 411 (washout) circuit and the variable low pass filter 314 (pseudo integrator) circuit respectively when both $V_E$ and $\dot{V}$ are zero. The gains $K_{V_E}$ and $K_{\dot{V}}$ in time constant programming means 414 are selected to increase the respective loop gains of washout circuit 411 and pseudo integrator circuit 413 for larger values of speed error or acceleration (e.g., a factor 0.4 per knot air speed error and a factor 5 per knot/second acceleration respectively) so that in an energy compensated speed control system, e.g., as shown in detail in the circuit schematic of FIG. 5, the compensation signals ($\dot{V}_{comp}$ and $\Delta V_{comp}$) are quickly reduced in the event of substantial air speed errors and/or acceleration and contribute little to the compensated output signals $\dot{V}$ and $V_E$ coupled to the autothrottle so that the autothrottle reverts temporarily to the original speed control until air speed error and acceleration are reduced to low values and the flight path has stabilized.

The complete schematic diagram shown in FIG. 5 utilizes time constant programming as shown in block form in FIG. 4 for the high pass (411) and low pass (413) filter circuit means which develop the respective compensation signals ($\dot{V}_{comp}$ and $\Delta V_{comp}$). Also it should be noted that in the system of FIG. 5, the signal representative of $$+ \frac{g}{W} \Delta T$$

is shown developed from signals representative of $\delta_T$ generated by throttle servo-tachometer means within the autothrottle computer electronics in the manner hereinbofre discussed only briefly in connection with the block diagram description of FIG. 3.

More specifically, in accordance with the embodiment of FIG. 5 a signal ($\delta_T$) representative of the rate of change in throttle position is coupled from autothrottle computer electronics 238 and more specifically from throttle servo-tachometer means 239 to the input of circuit means 310 representative of engine transfer function to develop a signal ($-\Delta T$) representative of the rate of change of thrust. Since only short term information is desired, the signal ($-\Delta T$) representative of the rate of change of thrust is coupled through low pass filter (pseudo integrator) circuit 312 to provide a signal $$(\frac{g}{W} \Delta T)$$

representative of short term acceleration of the aircraft due to thrust, to a first input of summing amplifier circuit 503. A signal ($+\dot{V}$) representative of longitudinal acceleration is coupled to a further input of summing amplifier circuit 503 to provide an output signal $$-(-\dot{V} + \frac{g}{W} \Delta T)$$

representative of the acceleration of the aircraft due to deviation from the flight path. This output signal taken at the output of summing amplifier circuit 503 is coupled to variable high pass filter (washout) circuit 411 for providing at the output thereof a compensation signal ($\dot{V}_{comp}$) which is summed in summing amplifier 240 with a signal ($+\dot{V}$) representative of longitudinal acceleration to provide a signal ($\dot{V}$) representative of compensated longitudinal acceleration for coupling to autothrottle means 238 for use as a new thrust control damping signal replacing $\dot{V}$. A multiplier circuit 421 is connected to provide feedback gain multiplication of amplifier A4 in response to the amplitude of control signal Y provided by time constant programmer circuit means 414. Input signal $X_1$ of multiplier 421 being the output of amplifier A4 is multiplied in magnitude by a factor proportional to the magnitude of the second input signal Y to multiplier 421, whereby Y is the output of the washout and pseudo integrator time constant programmer circuit 414. The time constant $\tau_1$ of high pass filter circuit 411 is thereby controlled by and is inversely proportional to the amplitude of control signal Y. The compensation signal ($\dot{V}_{comp}$) developed at the output of variable high pass filter circuit means 411 is utilized to provide a further compensation signal ($\Delta V_{comp}$) at the output of low pass filter circuit means 413 which is representative of air speed error due to deviation from the flight path of the aircraft. This further compensation signal ($\Delta V_{comp}$) is summed in summing amplifier 232 with a signal $V_E$ representative of air speed error to provide a signal $V_E$ representative of compensated air speed error for coupling to autothrottle means 238 for use as a new thrust control reference signal. The time constant of variable low pass filter circuit means 413 is responsive to the amplitude of control signal Y, being the second input of multiplier circuit 427 which is coupled in the feedback loop of amplifier A7 for multiplying the feedback $X_2$ of amplifier A7, which is the first input to multiplier circuit 427, by a factor proportional to Y. The time constant $\tau_2$ of low pass filter (pseudo integrator) circuit means 413 is therefore inversely proportional to the amplitude of control signal Y. A first signal representative of longitudinal acceleration ($\dot{V}$) and a second signal representative of air speed error ($V_E$) are amplified and combined in time constant programmer circuit means 414 and a bias signal (+bias) is added to provide a time constant programming control signal Y at the output of time constant programmer circuit means 414 which establishes predetermined minimum loop gains in variable high pass filter circuit means 411 and variable low pass filter circuit means 413 respectively when signals representative of $V_E$ and $\dot{V}$ are both equal to zero. The amplifier circuit A9 and further amplifier circuit A10 coupled in series circuit between the input signals representative of $\dot{V}$ and $V_E$ and the output terminal 498, provides amplification $K_{1_E}$ and $K_{\dot{1}}$ for respectively increasing the loop gain of washout circuit 411 and pseudo integrator circuit 413 so that the compensation signals ($\dot{V}_{comp}$ and $\Delta V_{comp}$) are amplitude limited so as to compensate only for air speed errors smaller than about 5 knots which are induced by flight path deviations.

Figure 6:
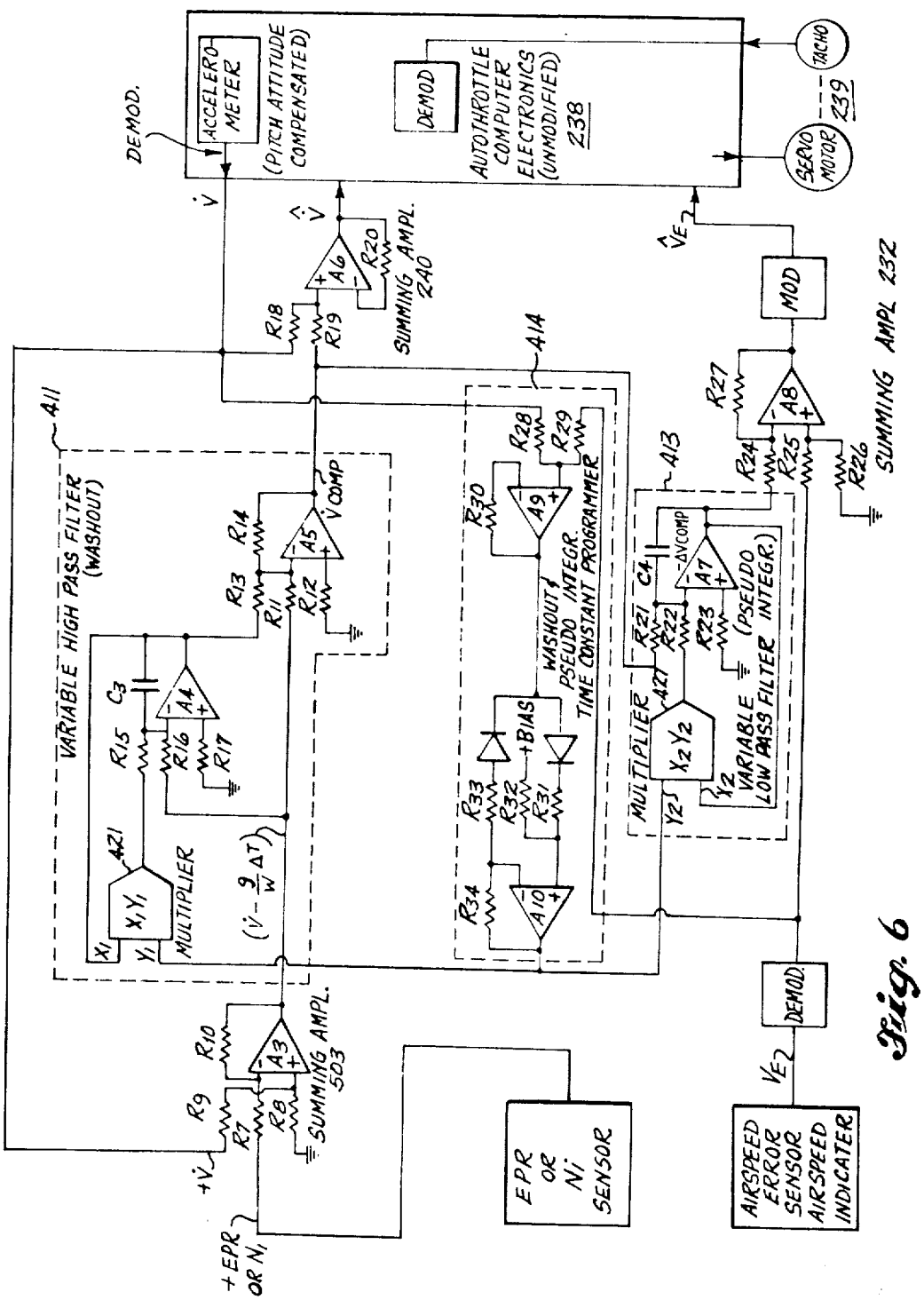
FIG. 6 is a schematic diagram of a further energy compensation system embodiment similar to the system shown in FIG. 5 however utilizing an EPR (engine pressure ratio) or $N_1$ (fan speed) signal source for providing an input signal representative of thrust.
Figure 7:
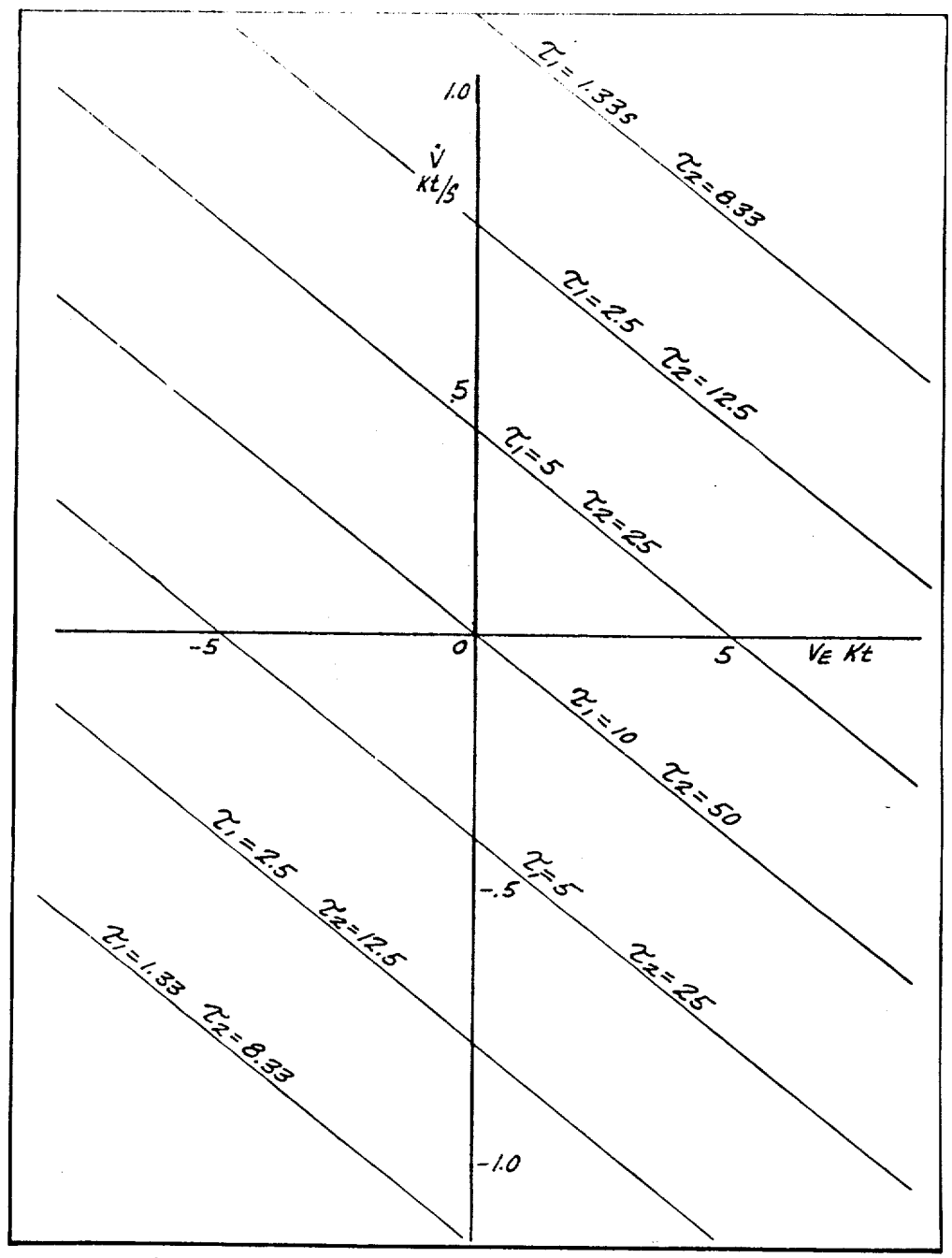
FIG. 7 is a series of graphs illustrative of the values of the variable time constants programmed as functions of air speed error and longitudinal acceleration for the high and low pass filters utilized in the systems of FIGS. 5 and 6.

It was previously noted in connection with the description of the system of FIG. 5 and also in FIG. 6 that variable time constant $\tau_1$ and $\tau_2$ programming was utilized in the high and low pass filter circuits 411 and 413 respectively under the control of programming control signal Y. Exemplary plots of these time constants are shown in FIG. 7. Now from an analysis of autothrottle and airplane dynamics it has been noted that a known type autothrottle controls air speed errors efficiently for frequencies below 0.1 rad/sec in an exemplary jumbo jet type airplane (Boeing type 747) utilizing such autothrottle. The cutoff frequency for throttle operation is therefore preselected at 0.1 rad/sec, resulting in a nominal time constant $\tau_1$ in the present energy compensation system of 10 seconds. Above 0.1 rad/sec the short term compensation signal ($\dot{V}_{comp}$) thereby cancels the elevator induced signal representative of acceleration ($\dot{V}$). To obtain reasonably accurate integration above 0.1 rad/sec with the pseudo integrator circuit 413, the time constant $\tau_2$ must be at least several times greater than $\tau_1$. Hence, $\tau_2$ equal to about 50 seconds was chosen. The preselected value of $\tau_1$ is also influenced by the amount of stability improvement necessary and the maximum air speed errors permitted during maneuvering with the present energy compensation system in an active condition (controlling the autothrottle 238) and varies therefore for different airplanes depending upon airplane characteristics. Generally, the stability of the present system improves with increasing time constant $\tau_1$ (while also the air speed errors during maneuvers increase). The values of the variable time constants $\tau_1$ and $\tau_2$ programmed by the signals $V_E$ and $\dot{V}$ is given in FIG. 7 for the above-mentioned type aircraft (Boeing type 747). The rapid decrease in $\tau_1$ and $\tau_2$ for increasing $V_E$ and $\dot{V}$ can be observed, which results in the limitation of the air speed errors which are allowed not to be controlled immediately by the present system.

Now it should be noted that the engine transfer function as represented by circuit 310 of FIG. 5, is unique for a given airplane under a single set of flight conditions. Generally, this transfer function does not change appreciably in the limited range of operating conditions of the autothrottle. The equivalent circuit representative of the engine transfer function can therefore be comprised of fixed circuit components as shown in circuit 310.

Generally, the response of engine thrust to throttle inputs is described by a first order lag. The type JT9F engine manufactured by Pratt and Whitney and utilized on the Boeing type 747 airplane for example responds in the higher thrust regions with a first order lag time constant of approximately 1.5 seconds. In the engine transfer function model circuit 310 this would require $R_3 C_1$ to be 1.5, while the ratio of $R_3/R_2$ in the circuit 310 is dictated by the static thrust gain per unit change of throttle position.

Deviation of the engine as represented by the circuit 310 from actual engine performance under a preselected set of conditions affects the performance of the energy compensation system of FIG. 5. The main deviation occurs with thrust change per degree of throttle position change from preselected conditions, and within the range of variation of this parameter normally encountered by the system the energy compensation system of FIG. 5 will operate satisfactorily although not optimally everywhere. An alternate approach to utilizing transfer function circuit 310 for deriving a signal representative of $\Delta \dot{T}$ for the present energy compensation system is to use another parameter that more closely represents thrust throughout the operating range, such as Engine Pressure Ratio (EPR) or fan speed ($N_1$) in the manner shown in FIG. 6. Although the energy compensation system embodiment of FIG. 6 requires one additional sensor input, the signal source representative of EPR or $N_1$ does not require throttle rate pseudo integration or the engine transfer function signal processing circuits as shown in the system of FIG. 5. Since the total thrust may vary due to the failure of one engine the system may take this into consideration by providing a summing of all four ingine EPR's each with ¼ of the thrust gain constant.

It should be noted from FIG. 5 that the compensation signal $\Delta V_{comp}$ provided at the output of low pass filter circuit means 413 is summed with the signal ($V_E$) representative of air speed error in summing amplifier circuit 232 to provide the compensated air speed error signal ($\hat{V}_E$) which is coupled to the autothrottle computer circuit means 238 for utilization as the improved thrust control reference signal, replacing the signal $V_E$ utilized by prior art autothrottle computer circuit means.

Proceeding now to a further description of signal processing in the system of FIG. 5 and more particularly as utilized to generate the time constant programming control signal Y, and the manner in which control signal Y controls the time constants $\tau_1$ and $\tau_2$ of washout and pseudo integrator circuits 411 and 413 respectively to further control the amplitude of compensation signals $\dot{V}_{comp}$ and $\Delta V_{comp}$, it will be noted that the time constant programming control signal Y is generated at the output terminal 498 of washout and pseudo integrator time constant programmer circuit means 414. In circuit means 414, the signal representative of air speed error ($V_E$) and acceleration ($\dot{V}$) are summed with multiplication gains $K_{1_E}$ and $K_{\dot{1}}$, respectively, in summing amplifier circuit means A9. The output of summing amplifier circuit means A9, provides a signal representative of the expression $K_{1_E} V_E + K_{\dot{1}} \dot{V}$ which is coupled through amplitude detector circuit means comprising a pair of diodes and added with a positive bias signal in amplifier circuit means A10 to provide time constant programming control signal Y at output terminal 998 which is equal to $|K_{1_E} \cdot V_E + K_{\dot{1}} \cdot \dot{V}|$ + constant. The detection of the amplitude or absolute value of the signals in accordance with the following expression $K_{1} \cdot V_E + K_{1'} \cdot \dot{V}$ is utilized to insure negative feedback gains for the variable low pass and high pass filter circuits 413 and 411 respectively. The bias is chosen to yield minimum loop gains $1/\tau_1$ and $1/\tau_2$ for the respective filter circuits when $K_{1'} \cdot V_E + K_{1'} \cdot \dot{V} = 0$. For the condition where the signals represented by the expression $[K_{1'} \cdot V_E + K_{1'} \cdot \dot{V}] = 0$ the system of FIG. 5 is equivalent to the system of FIG. 3. When the signals representative of the expression $K_V \cdot V_E + K_V \cdot V$ increase substantially, such as during glide slope capture maneuvers indicative of a buildup of substantial air speed errors, the amplitude of the time constant programming control signal Y increases so as to provide decreasing washout and pseudo integrator time constant thereby causing reduction in the rate of increase in amplitude of compensation signals $V_{comp}$ and $\Delta V_{comp}$. For larger amplitude signals representative of the expression $K_V \cdot V_E + K_V \cdot V$ the respective time constants decrease so that the amplitudes of compensation signals $V_{comp}$ and $\Delta V_{comp}$ are rapidly reduced to zero values thereby causing the autothrottle to revert to conventional speed control until air speed error and acceleration are reduced below predetermined values, e.g., air speed errors are reduced below a predetermined value of 5 knots. In simulation testing, it was found that with the system of FIG. 5, the air speed errors could be held within ±5 knots for normal glide slope capture or go-around maneuvers.

What is claimed is:

1. In combination an autothrottle control system for an aircraft having a first input coupled to first means for providing a signal representative of longitudinal acceleration information of said aircraft, and a second input coupled to second means for providing a signal representative of air speed error of said aircraft;

signal processing means responsive to signals representative of pitch attitude and angle of attack information of said aircraft for providing a first compensation signal representative of longitudinal acceleration of said aircraft induced by short term flight path angle changes and a second compensation signal representative of the deviation of air speed due to short term flight path angle changes;

third means for combining said first compensation signal with said signal representative of longitudinal acceleration information of said aircraft; and fourth means for combining said second compensation signal with said signal representative of air speed error of said aircraft.

2. The invention according to claim 1 wherein said third and fourth means comprise summing amplifiers.

3. In combination;

an aircraft autothrottle having first and second input terminals for receiving signals representative of longitudinal acceleration and air speed error;

pitch attitude sensing means for providing a first signal representative of pitch attitude of the aircraft;

angle of attack sensing means for providing a second signal representative of angle of attack of the aircraft;

first summing amplifier means for combining said first and second signals and providing a third signal;

first washout circuit means responsive to said third signal for providing a first compensation signal;

attitude compensated longitudinal accelerometer means for providing a fourth signal representative of longitudinal acceleration;

second summing amplifier means responsive to said fourth signal and said first compensation signal for providing a signal representative of compensated longitudinal acceleration;

first coupling means for coupling said signal representative of compensated longitudinal acceleration to said first input terminal;

air speed error sensing means coupled to demodulator circuit means for providing a signal representative of air speed error of the aircraft;

pseudo integrator circiut means responsive to said first compensation signal for providing a second compensation signal;

third summing amplifier means responsive to said second compensation signal and said signal representative of air speed error for providing a signal representative of compensated air speed error; and, second coupling means for coupling said signal representative of compensated air speed error to said second input terminal.

4. In an autothrottle control system, an improvement for inhibiting autothrottle response to speed perturbations induced by flight path deviations comprising:

first means for generating a first compensation signal in accordance with the expression $$g \cdot \Delta(\theta - \alpha) + \frac{C_D \cdot q \cdot s \cdot g}{W} \Delta \alpha$$

second means for generating a second compensation signal in accordance with the expression $$g \cdot \Delta(\theta - \alpha) + \frac{C_D \cdot q \cdot s \cdot \Delta \alpha}{W} dt$$

wherein the above expressions $g$ is gravity acceleration, $\Delta \theta$ is change in pitch attitude, $\Delta \alpha$ is change in angle of attack, $C_D$ is drag coefficient change per unit change in $\alpha$, $q$ is dynamic pressure, $s$ is wing area, and $w$ is weight;

third means for combining said first compensation signal with the signal input to an autothrottle representative of longitudinal acceleration; and fourth means for combining said second compensation signal with the signal input to said autothrottle representative of air speed error.

5. In an aircraft authrottle control system having a first autothrottle input signal representative of longitudinal acceleration and a second input signal representative of air speed error:

first means for generating a third signal representative of change in flight path angle;

second means for generating a fourth signal representative of change in drag with respect to change in angle of attack multiplied by the product of dynamic pressure times wing area divided by the weight of the aircraft;

third means for summing said third and fourth signals thereby providing a fifth signal;

a washout circuit;

fourth means for multiplying said fifth signal by the gravity acceleration constant and coupling the product to said washout circuit to provide a first compensation signal;

fifth means responsive to said first compensation signal for providing pseudo integration of said first compensation signal to provide a second compensation signal;

sixth means for summing said first compensation signal with said first autothrottle input signal to provide a compensated first autothrottle input signal; and seventh means for summing said second compensation signal with said second autothrottle input signal to provide a compensated second autothrottle input signal.

6. In an autothrottle for an aircraft having first and second autothrottle input signals representative of longitudinal acceleration and air speed error, means for compensating said first and second autothrottle input signals comprising:
first summing circuit means having a plurality of input terminals and an output terminal;
throttle servo-tachometer means, circuit means representative of engine transfer function of the aircraft, and pseudo integrator circuit means connected in series circuit with a first of said plurality of input terminals;
second circuit means for coupling said first signal representative of longitudinal acceleration to a second of said plurality of input terminals;
washout circuit means coupled to said output terminal for providing a first compensating signal;
third circuit means for combining said first autothrottle input signal representative of longitudinal acceleration with said first compensating signal to provide a compensated first autothrottle input signal;
further pseudo integrator circuit means responsive to said first compensating signal for providing a second compensating signal; and
fourth circuit means for combining said second input signal representative of air speed error with said second compensating signal to provide a compensated second autothrottle input signal.

7. The invention of claim 6 wherein the time constant of said washout circuit means and the further time constant of said further pseudo integrator circuit means vary as a function of the sum of air speed and forward acceleration of said aircraft.

8. The invention of claim 6 wherein said washout circuit means and said further pseudo integrator circuit means comprise respectively first and second variable time constant filtering means.

9. The invention according to claim 8 further including time constant programming means responsive to increasing air speed errors and forward accelerations of said aircraft for decreasing the respective time constants of said first and second variable time constant filtering means.

10. The invention according to claim 8 further including time constant programming means for multiplying the respective loop gains of said first and second variable time constant filtering means.

11. The invention according to claim 10 wherein said time constant programming means comprises:
first amplifier means responsive to air speed error for providing an amplified air speed error signal;
second amplifier means responsive to forward acceleration for providing an amplified forward acceleration signal;
a positive bias signal source; and
means for providing the absolute sum of said amplified error signal and said forward acceleration signal and adding to said sum said positive bias signal to provide a programming control signal for multiplying said respective loop gains of said first and second variable time constant filtering means.

12. The invention according to claim 11 wherein the gain factor of said first amplifier means is 0.4 per knot air speed error and the gain factor of said second amplifier means is 5 per knot per second acceleration.

13. In an aircraft autothrottle control system:
first circuit means for providing a first signal representative of rate of change in throttle position;
second circuit means representative of engine transfer function of said aircraft responsive to said first signal for providing a second signal representative of rate of change of thrust;
pseudo integrator circuit means responsive to said second signal for providing a third signal representative of short term acceleration of said aircraft due to thrust;
third circuit means for providing a fourth signal representative of longitudinal acceleration of said aircraft;
fourth circuit means comprising a summing amplifier circuit responsive to said third and fourth signals for providing a fifth signal representative of acceleration of said aircraft due to deviation from the flight path;
fifth circuit means comprising a washout circuit responsive to said fifth signal for providing a compensation signal;
sixth circuit means comprising a summing amplifier responsive to said fifth signal and said compensation signal for providing a signal representative of compensated longitudinal acceleration for coupling to autothrottle for utilization as a thrust control damping signal;
seventh circuit means comprising a pseudo integrator circuit responsive to said compensation signal for providing a further compensation signal representative of air speed error due to deviation from flight path;
eighth circuit means for providing a sixth signal representative of air speed error; and
ninth circuit means comprising a summing amplifier responsive to said sixth signal and said further compensation signal for providing a signal representative of compensated air speed error for coupling to autothrottle for utilization as a thrust control reference signal.

14. In an autothrottle control system having first and second input signals representative of compensated longitudinal acceleration and compensated air speed error coupled as input signals to an autothrottle; compensating means comprising:
first means including circuit means representative of engine transfer function for providing a third signal representative of change in thrust;
second means for providing a fourth signal representative of pitch attitude compensated longitudinal acceleration;
third means for providing a fifth signal representative of air speed error;
fourth means comprising summing amplifier means responsive to said third and fourth signals for providing a sixth signal;
fifth means comprising washout circuit means responsive to said sixth signal for providing a first compensation signal;
sixth means comprising summing amplifier means for combining said first compensation signal with said fourth signal to provide said first input signal to the autothrottle;

seventh means including pseudo integrator circuit means responsive to said first compensation signal for providing a second compensation signal; and eighth means comprising summing amplifier circuit means for combining said second compensation signal with said fifth signal for providing said second input signal to the autothrottle.

15. A system for computing speed perturbations due to path deviations of an aircraft to provide first and second compensating signals for coupling respectively to autothrottle control system input signal control channels representative of longitudinal acceleration and air speed error comprising:

first means for generating a signal representative of acceleration of said aircraft due to change in flight path angle;

a washout circuit responsive to said signal representative of acceleration of said aircraft due to change in flight path angle for providing said first compensating signal;

low pass filter circuit means responsive to said first compensating signal for providing said second compensating signal; and wherein said first means comprises means for generating a signal representative of $$g\,\Theta + \left[\frac{C_D\,q\,s}{W} - 1\right]\alpha$$

where $g$ is gravity acceleration constant, $\theta$ is pitch attitude, $C_D$ is drag coefficient change per unit change in $\alpha$, $q$ is dynamic pressure, $s$ is wing area, $w$ is weight, and $\alpha$ is angle of attack.

* * * * *